(No Model.)
S. J. AASEN.
FANNING MILL SIEVE.
No. 323,096. Patented July 28, 1885.
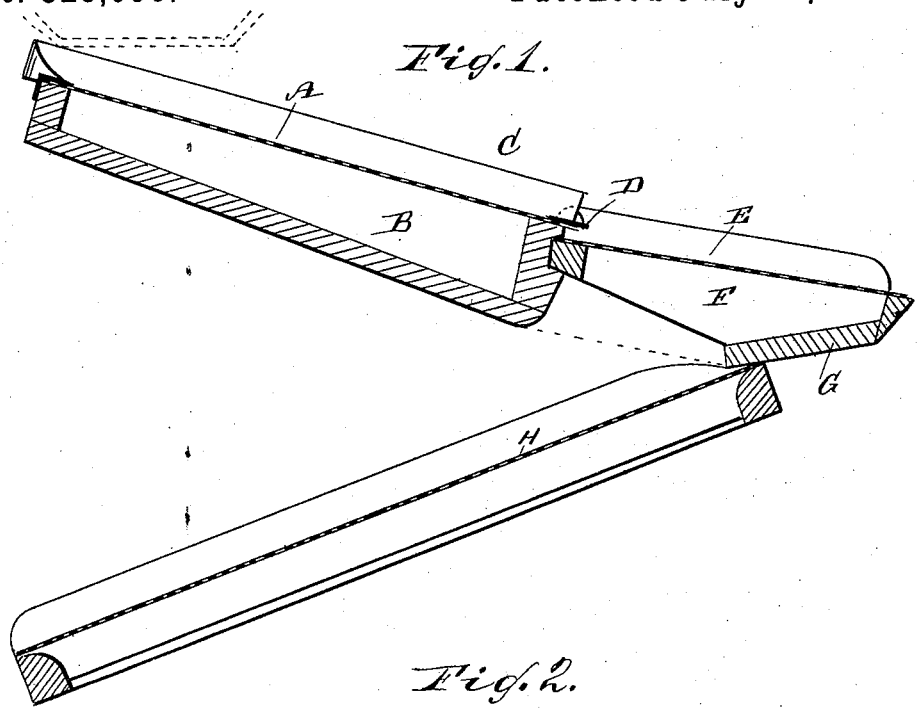
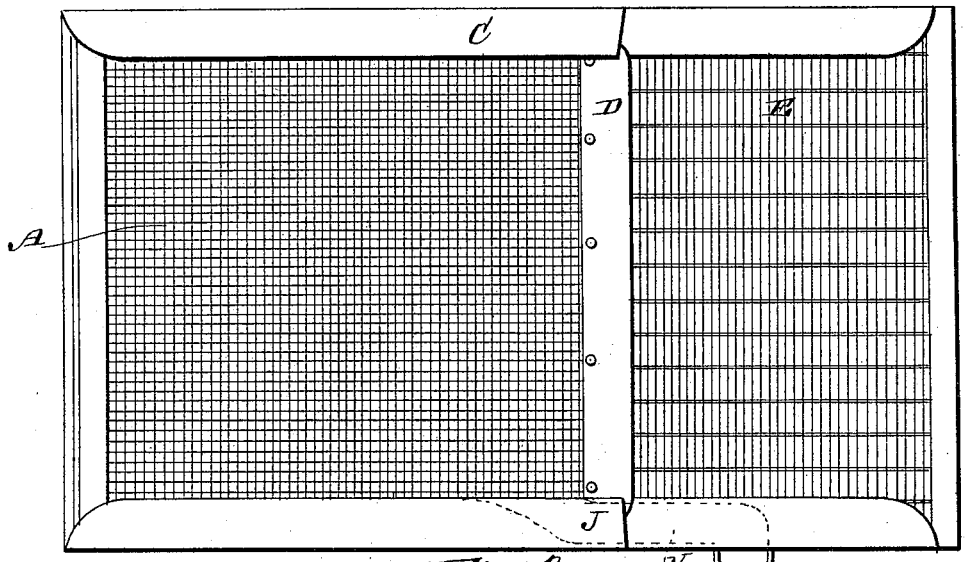
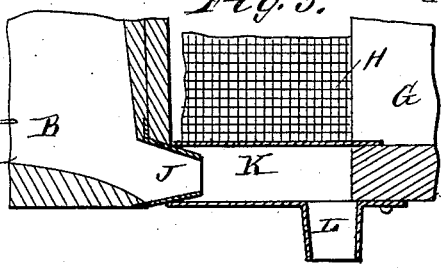
WITNESSES:
Theo. F. Hoster
C. Sedgwick
INVENTOR:
S. J. Aasen
BY Munn & Co.
ATTORNEYS.

United States Patent Office.

SIVER J. AASEN, OF REPUBLICAN, DAKOTA TERRITORY.

FANNING-MILL SIEVE.

SPECIFICATION forming part of Letters Patent No. 323,096, dated July 28, 1885.

Application filed April 15, 1885. (No model.)

*To all whom it may concern:*

Be it known that I, SIVER J. AASEN, of Republican, in the county of Minnehaha and Territory of Dakota, have invented new and useful Improvements in Fanning-Mill Sieves, of which the following is a full, clear, and exact description.

The object of my invention is to provide a new and useful improvement in fanning-mill sieves to facilitate cleaning and separating the different kinds of seeds.

The invention consists in the combination and arrangement of sieves in relation to each other, all as hereinafter fully described, and pointed out in the claim.

Reference is to be had to the accompanying drawings, forming part of this specification, in which similar letters of reference indicate corresponding parts in all the figures.

Figure 1 is a longitudinal sectional elevation of my improved fanning-mill sieves. Fig. 2 is a plan view of the same. Fig. 3 is a detail sectional view of a part.

The sieve A is secured on the top edge of a box, B, having side ledges, C, and at the lower end of the sieve an apron, D, is provided, which projects beyond the lower edge of the box. The sieve A is arranged below the hopper of a fanning-mill, and extends toward the rear, and has a greater or less inclination, according to the condition of the seed. Below the lower end of the sieve A the sieve E is arranged, which has but a slight inclination, and also extends to the rear, and is secured on a box, F, having half a bottom, G. The lower inner edge of the bottom G rests upon the upper end of a larger sieve, H, which is inclined in the inverse direction of the sieves A and E, and is secured on a suitable frame. A spout, J, leads from the lower end of the box B into a chute, K, formed below the sieve E, and at one side of the box, and at the lower end of the chute K a spout, L, projects from the side of the box F. The flax passes from the hopper upon the sieve A, and all the small seeds— such as pigeon-seeds, mustard-seeds, &c.—pass through the said sieve A into the box B, slide down the bottom of the same through the spout J, the chute K, and out through the spout L into a suitable receptacle. The flaxseeds, as well as all larger seeds, are carried over the sieve A upon the sieve E, and only the flax and remaining fine seeds pass through the said sieve E upon the bottom G, and slide down the same upon the sieve H. All the flax and remaining fine seeds pass through the sieve H, and the ordinary seeds of the normal size pass down the sieve H to the front of the machine. The fine seeds are deposited in a receiving-box under the sieve H. The larger seeds—such as buckwheat, cockle, oats, &c.— that cannot pass through the sieve E slide down over the same and into a suitable box. The seeds are thus separated into four lots of different sizes in one operation, and the seed is thoroughly cleaned.

Having thus described my invention, what I claim as new, and desire to secure by Letters Patent, is—

The combination, with the sieve A, the box B, the box F, the sieve E below the lower edge of the sieve A, and the sieve H below the sieve E and inclined in the inverse direction, of the spout J on the lower end of the box B, the chute K at the side of the box F, carrying the sieve E, and the spout L, substantially as herein shown and described.

SIVER J. AASEN.

Witnesses:
ALF. T. MOE,
O. S. SWENSON.